US012722298B1

(12) United States Patent
Kaufman et al.

(10) Patent No.: US 12,722,298 B1
(45) Date of Patent: Sep. 1, 2026

(54) ROBOT MOVEMENT CONTROLS BASED ON IDENTIFIER ENCODING SIGNALS

(71) Applicant: Amazon Technologies, Inc., Seattle, WA (US)

(72) Inventors: Seth R Kaufman, Arlington, MA (US); Erik Edward Steltz, Melrose, MA (US); Renen Bassik, Lexington, MA (US); Gabriel Hebert, Wakefield, MA (US); Eric Jones, Somerville, MA (US)

(73) Assignee: Amazon Technologies, Inc., Seattle, WA (US)

( * ) Notice: Subject to any disclaimer, the term of this patent is extended or adjusted under 35 U.S.C. 154(b) by 316 days.

(21) Appl. No.: 18/126,553

(22) Filed: Mar. 27, 2023

(51) Int. Cl.
*B25J 9/00* (2006.01)
*B25J 9/16* (2006.01)

(52) U.S. Cl.
CPC ... *B25J 9/1674* (2013.01); *G05B 2219/39001* (2013.01)

(58) Field of Classification Search
CPC ..................... B25J 9/1674; G05B 2219/39001
See application file for complete search history.

(56) References Cited

U.S. PATENT DOCUMENTS

| | | | | |
|---|---|---|---|---|
| 11,097,422 | B2 * | 8/2021 | Denenberg | B25J 9/1666 |
| 11,422,569 | B2 * | 8/2022 | Pardasani | G05B 19/41895 |
| 11,426,871 | B1 * | 8/2022 | Anderson | B25J 9/1664 |
| 12,023,772 | B2 * | 7/2024 | Hediger | B23Q 3/1554 |
| 12,122,367 | B2 * | 10/2024 | Gariepy | B60W 30/09 |
| 2005/0128077 | A1 * | 6/2005 | Seemann | G07C 9/28 340/5.2 |
| 2008/0021597 | A1 * | 1/2008 | Merte | F16P 3/144 700/255 |
| 2011/0007639 | A1 * | 1/2011 | Richardson | H04W 8/005 370/252 |

(Continued)

FOREIGN PATENT DOCUMENTS

| | | | | |
|---|---|---|---|---|
| CN | 103443612 A | * 12/2013 | | A47L 11/4013 |
| CN | 108469274 A | * 8/2018 | | G05B 19/04 |

(Continued)

OTHER PUBLICATIONS

CN108469274A (Year: 2018).*

*Primary Examiner* — Ramon A. Mercado
*Assistant Examiner* — Shaheda Hoque
(74) *Attorney, Agent, or Firm* — Kilpatrick Townsend & Stockton LLP

(57) ABSTRACT

Techniques for controlling robot movement based on identifier encoding signals are described herein. For example, a device can determine a safety state of a physical location indicating a permission to transmit signals. The safety state can be associated with an operation that can be performed at the physical location. The device can be associated with the physical location. The device can transmit, at a first time based at least in part on the trigger, a first signal that indicates a first identifier. The first identifier can match a second identifier available to an autonomous mobile robot (AMR) from a location marker associated with the physical location. The device can transmit, at a second time, a second signal that indicates the first identifier, the first signal and the second signal enabling the AMR to perform the operation.

20 Claims, 13 Drawing Sheets

(56) References Cited

U.S. PATENT DOCUMENTS

| | | | | | |
|---|---|---|---|---|---|
| 2011/0130874 | A1* | 6/2011 | Tsao | G05D 1/0242 | 700/245 |
| 2013/0245825 | A1* | 9/2013 | Vicentini | B25J 9/1674 | 901/9 |
| 2015/0328775 | A1* | 11/2015 | Shamlian | B60L 53/68 | 901/1 |
| 2017/0113352 | A1* | 4/2017 | Lutz | B25J 9/1682 | |
| 2018/0107969 | A1* | 4/2018 | Trivelpiece | B25J 9/1679 | |
| 2019/0224846 | A1* | 7/2019 | Pivac | G05B 19/4097 | |
| 2020/0172352 | A1* | 6/2020 | Elazary | B65G 59/02 | |
| 2020/0316786 | A1* | 10/2020 | Galluzzo | B25J 5/007 | |
| 2021/0008721 | A1* | 1/2021 | Voorhies | G06Q 10/08 | |
| 2021/0046650 | A1* | 2/2021 | Deyle | G05D 1/0214 | |
| 2021/0191414 | A1* | 6/2021 | Tolstov | B64U 80/86 | |
| 2022/0047134 | A1* | 2/2022 | Burbank | G05D 1/0214 | |
| 2022/0073062 | A1* | 3/2022 | Gariepy | B60W 30/09 | |
| 2022/0126451 | A1* | 4/2022 | Hopkinson | B25J 9/1676 | |
| 2022/0163647 | A1* | 5/2022 | Si | G01S 11/02 | |
| 2022/0291726 | A1* | 9/2022 | Foster | G08C 17/02 | |
| 2023/0044622 | A1* | 2/2023 | Grant | A01G 13/35 | |
| 2023/0085100 | A1* | 3/2023 | Akey | B25J 11/0055 | 83/39 |
| 2023/0188557 | A1* | 6/2023 | Bivans | H04L 63/105 | 726/25 |
| 2023/0331484 | A1* | 10/2023 | Elazary | B65G 1/1371 | |

FOREIGN PATENT DOCUMENTS

| | | | | |
|---|---|---|---|---|
| DE | 102023101589 A1 | * | 8/2023 | G05D 1/0219 |
| EP | 4421445 A1 | * | 8/2024 | G01B 11/272 |
| IT | MI20101767 A1 | * | 3/2012 | B25J 9/1694 |
| JP | 2023040964 A | * | 3/2023 | B25J 9/1676 |
| WO | WO-2022170279 A1 | * | 8/2022 | B25J 9/162 |

* cited by examiner

Determine, by a device, a safety state of a physical location indicating a permission to transmit signals, the safety state associated with an operation performable at the physical location 902

Transmit, at a first time based at least in part on the safety state, a first signal that indicates a first identifier, the first identifier matching a second identifier available to an AMR from a location marker associated with the physical location 904

Transmit, at a second time, a second signal that indicates the first identifier, the first signal and the second signal enabling the AMR to perform the operation 906

Determine another trigger to stop transmitting the signals 908

Forgo, based at least in part on the other trigger, a transmission at a third time of a third signal that indicates the first identifier, the forgoing of the transmission causing the AMR to stop the operation 910

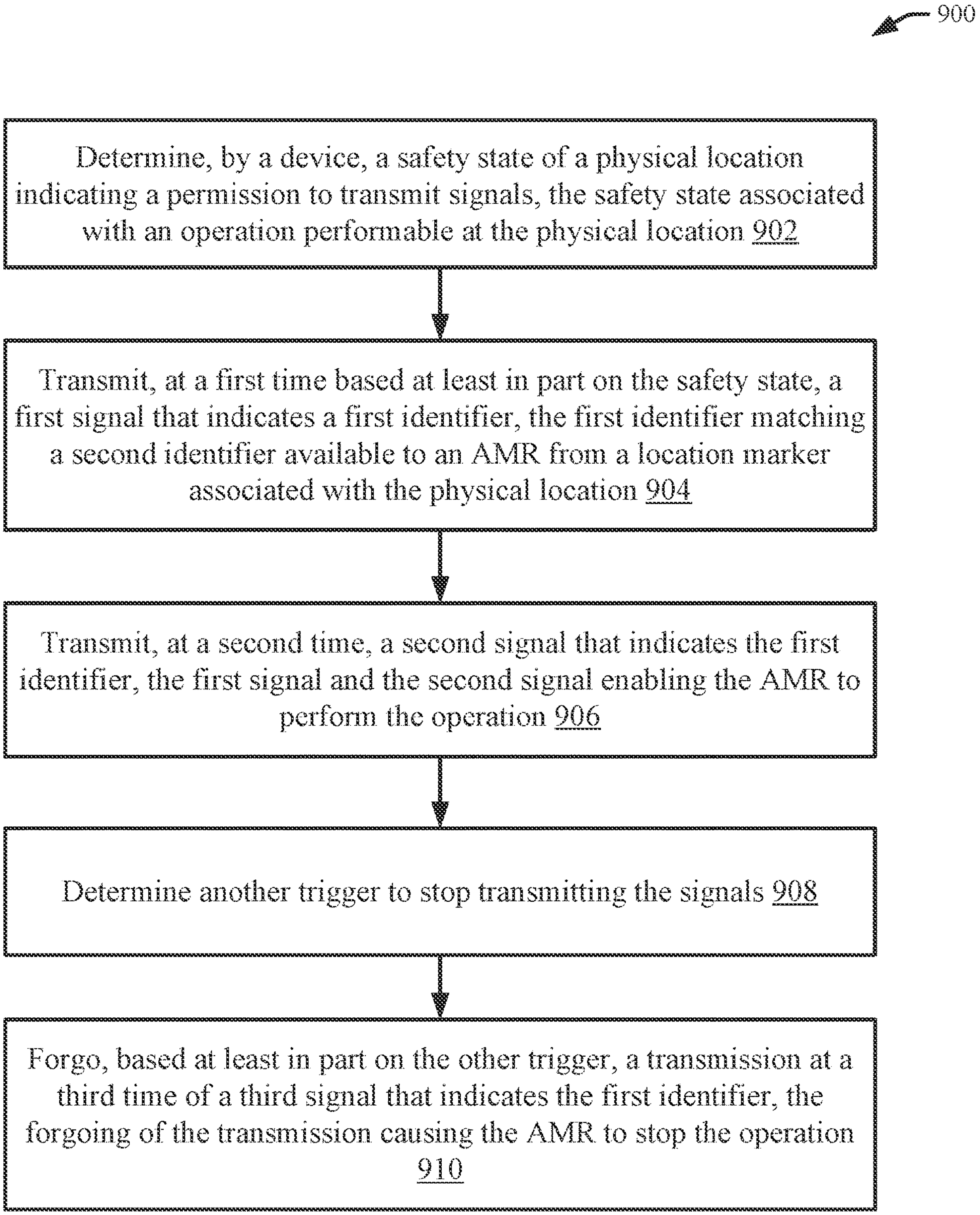

FIG. 9

Determine, by an AMR, a first identifier based at least in part on a first signal associated with a location marker, the location marker associated with a physical location 1002

Receive a second signal transmitted by a device, the device associated with the physical location, the second signal indicating a second identifier 1004

Determine a match between the first identifier and the second identifier 1006

Determine, based at least in part on the match, that an operation is to be performed at the physical location 1008

Perform the operation at the physical location 1010

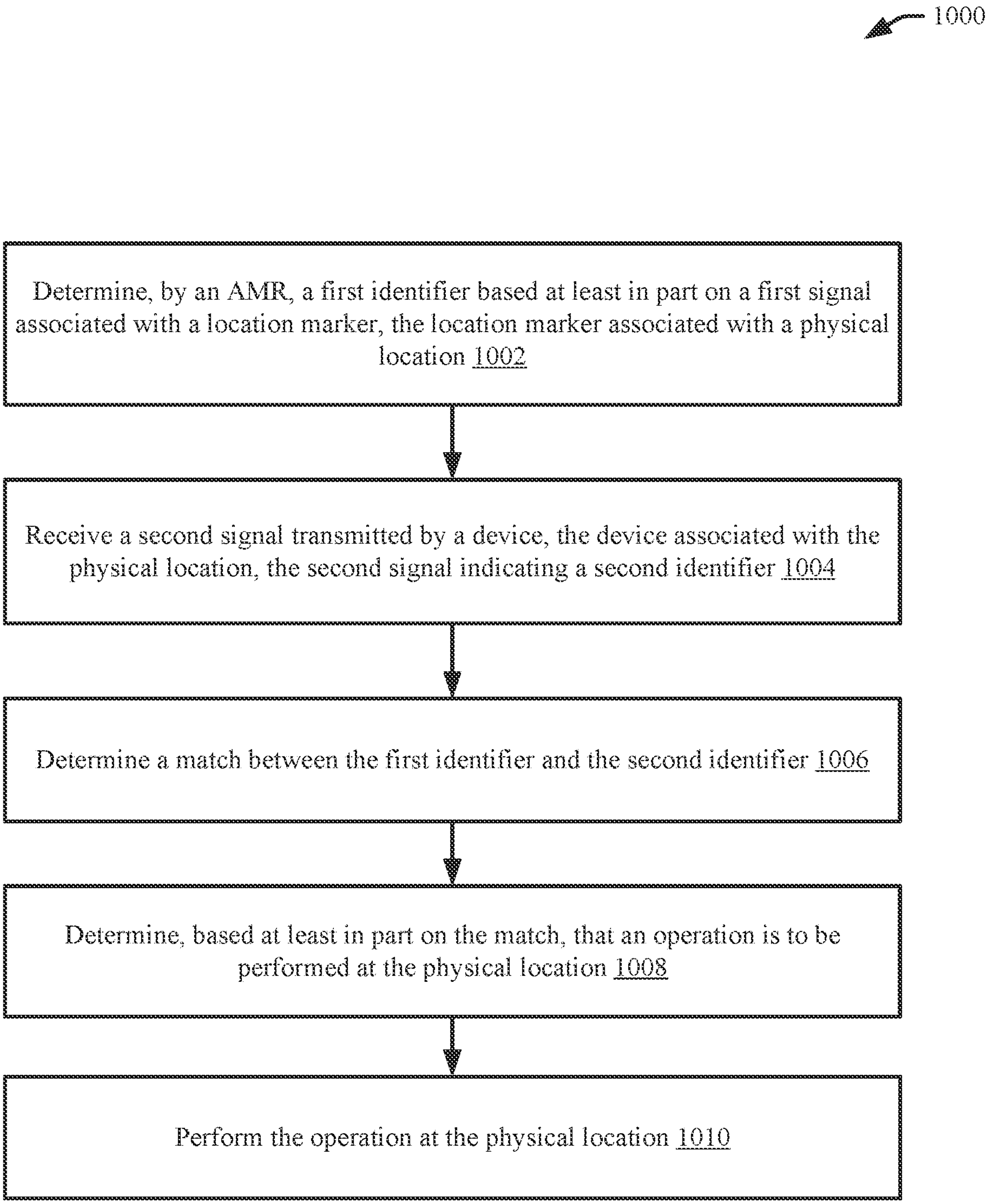

FIG. 10

Determine, by an AMR, that an identifier associated with a workcell is expected 1102

Determine a second identifier by reading a location identifier at a workcell 1104

Match the expected identifier with the read identifier to determine that the current location is the correct workcell 1106

Receive multiple signals that include identifiers 1108

Filter out signals that do not include the first identifier 1110

Process at least one signal that includes the first identifier based on the signal being received and the second identifier being detected within a threshold time 1112

Determine permission to perform the operation at the workcell based on the signal processing 1114

Switch AMR from first safety mode to second safety mode to enter the workcell 1116

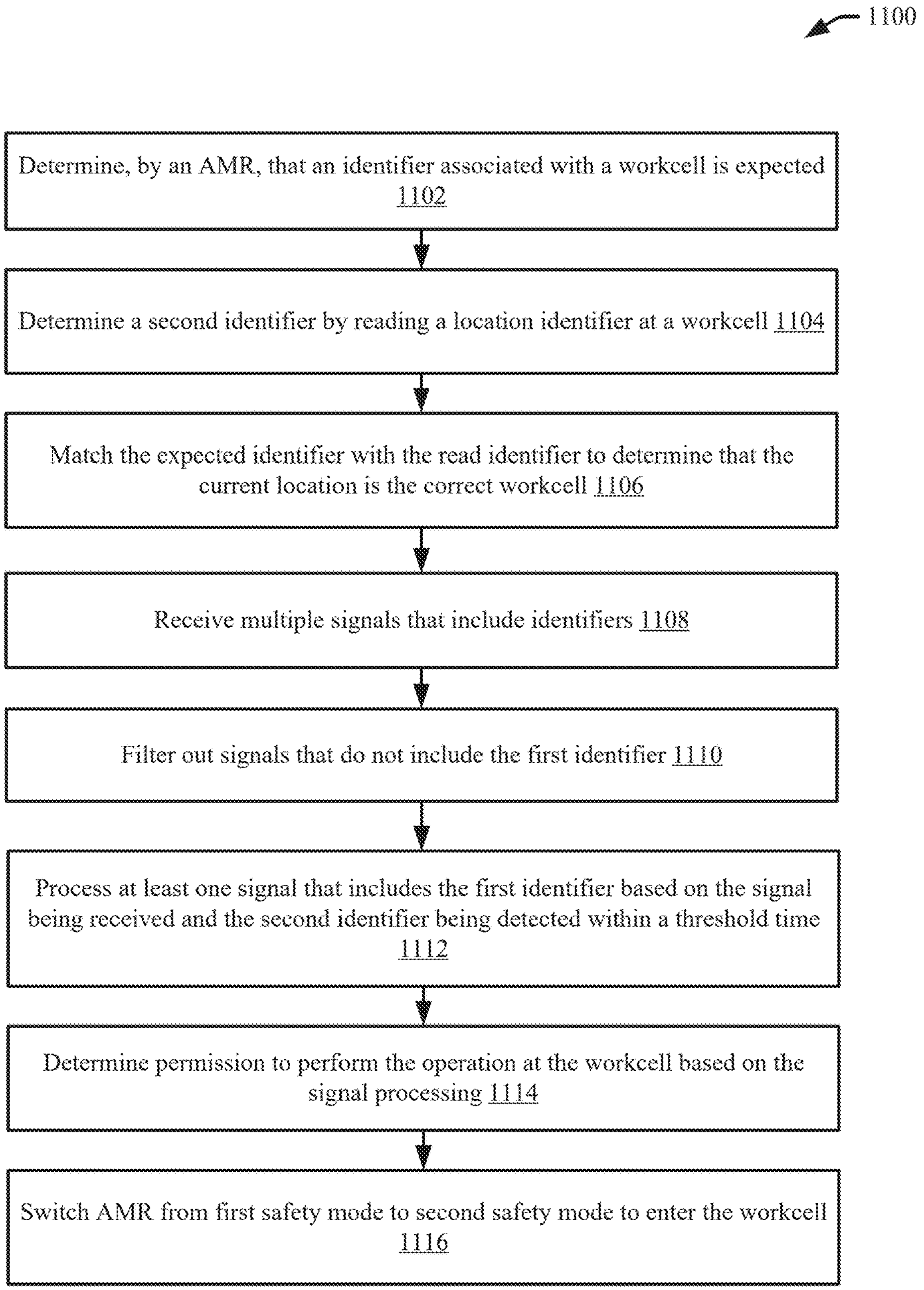

FIG. 11

Determine a most recent time a signal including an identifier was received 1302

Determine a time period since the most recent time 1304

Time Period < Threshold Value? 1306

Yes

No

Continue performing operation in the current safety mode 1308

Stop performing operation 1310

Switch to another safety mode 1312

ROBOT MOVEMENT CONTROLS BASED ON IDENTIFIER ENCODING SIGNALS

BACKGROUND

The present invention relates to robotics, and more specifically, to operating autonomous mobile robots (AMRs).

BRIEF DESCRIPTION OF THE DRAWINGS

Various embodiments in accordance with the present disclosure will be described with reference to the drawings, in which:

FIG. 4 illustrates a location marker for the workcell or the high-speed area, according to embodiments of the present disclosure;

FIG. 9 shows an example of a flow for controlling AMR movement based on transmitting encoded signals, according to embodiments of the present disclosure;

FIG. 10 shows an example of a flow for AMR movement based on location identifiers and encoded signals, according to embodiments of the present disclosure;

FIG. 11 shows an example of a flow for AMR movement based on location identifiers and encoded signals in a workcell, according to embodiments of the present disclosure;

DETAILED DESCRIPTION

Figure 1:
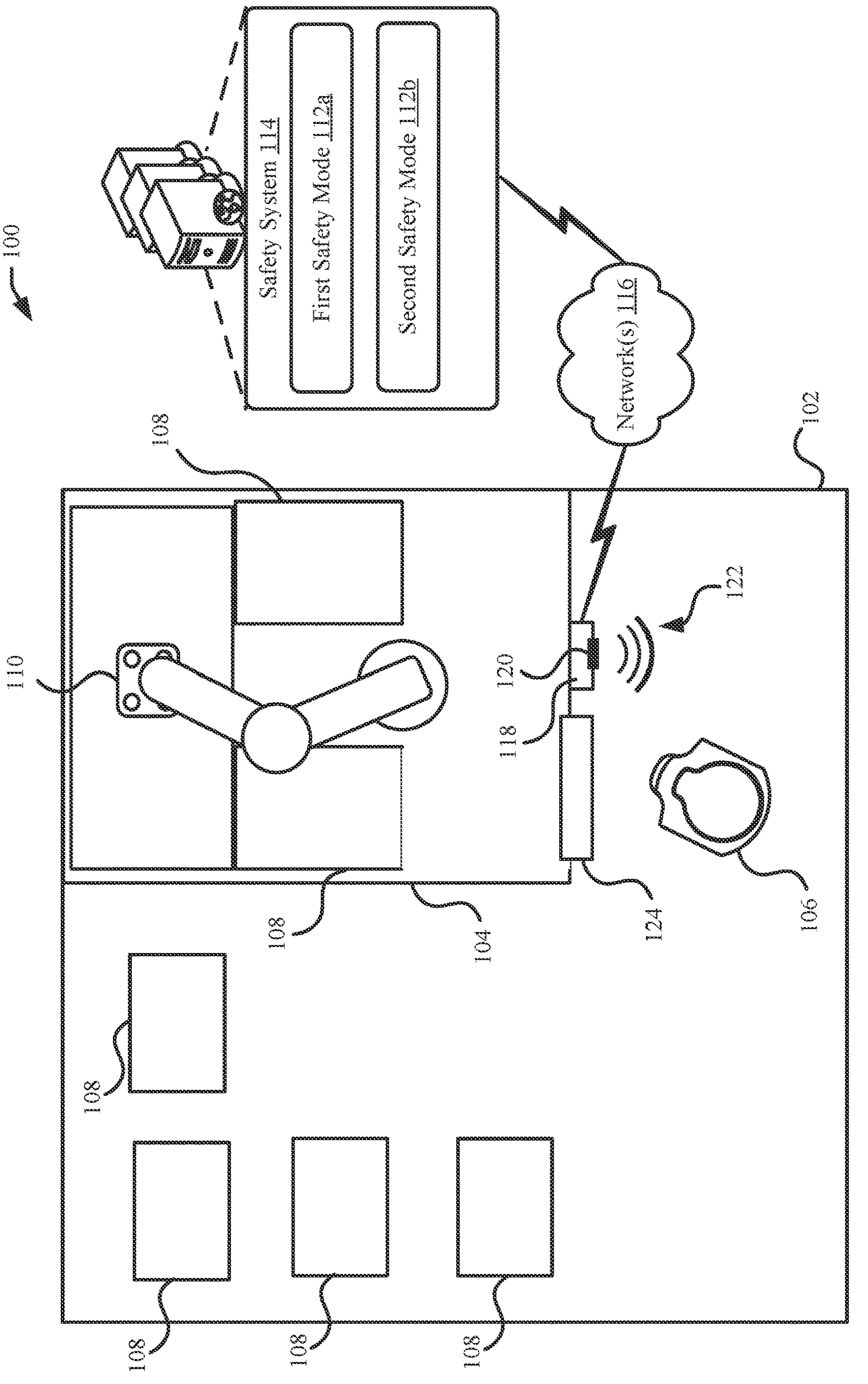
FIG. 1 illustrates an example of an autonomous mobile robot (AMR) in a facility that includes a workcell, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to, among other things, robot movement controls based on identifier encoding signals. In an example, a system can include a location marker installed at a physical location. The location marker can encode a first location identifier of the physical location. The system can also include a device that is co-located with the location marker. The device can transmit a signal indicating that an autonomous mobile robot (AMR) has permission to operate in the physical location. This permission can be based in part on an occupancy of the physical location. The signal can indicate the first location identifier. The system can also include the AMR. When the AMR is near the device, the AMR can determine the first location identifier based at least in part on an interaction with the location marker (e.g., an optical read of the location marker). The AMR can receive the signal transmit by the device. The AMR can also determine a second location identifier based at least in part on the signal and can determine a match between the first location identifier and the second location identifier. The AMR can then determine the permission indicated in the signal based at least in part on the match. The AMR can determine that an operation is permitted in the physical location based at least in part on the permission. The AMR can then perform the AMR based at least in part on the operation being permitted.

To illustrate, consider a facility such as a warehouse or factory. The facility may include various zones, such as workcells, container areas, and high-speed areas. AMRs may be used to move objects in the various zones. For example, AMRs may be used to lift and move heavy containers between zones of the facility. An AMR may operate according to safety protocols (e.g., object detection systems) programmed for the AMR so that the AMR does not hit or contact other objects or people while lifting and moving the container. Some facilities, however, may include spaces such as workcells that are smaller or more confined than other spaces in the facility. In such small spaces, the AMR may not have the necessary field of view to utilize the safety protocols while performing operations. For instance, the safety protocols may need to be disabled to perform the operations. This can result in possible injuries or accidents, such as collisions with unexpected objects or humans. Thus, a device located at the workcell can control AMR movement using a signal transmitted by the device to the AMR. The signal may be a permissive signal indicating that conditions are safe for operation. The permissive signal may operate under an idle current principle. That is, if the device stops transmitting the signal for any reason, the AMR will stop operation and revert to a known, controlled state while within the workcell. For example, the controlled state may involve preventing the AMR from moving. In some other examples, the signal may also be a restrictive signal that directs the AMR to stop an operation. The device can communicate a unique identifier encoded in the signal to represent a physical location of the device to the AMR so that multiple devices can operate near one another. The device can also display the unique identifier visually so that the AMR can match the unique identifier received in the signal to the displayed unique identifier to enable performance of operations at the physical location.

For example, the AMR may be directed to perform an operation in a restricted space such as a workcell. The device may be located outside of the workcell. Before the AMR is permitted to enter the workcell, the AMR can identify a location marker such as a QR code displayed by the device. The AMR can scan the QR code to determine a location identifier for the workcell. Meanwhile, the AMR may receive encoded signals from the device (and possibly other similar devices installed at other locations). The AMR can identify that signals from the device include the same location identifier for the workcell that is present in the QR code. Once the match is confirmed, the AMR can be authorized to enter the workcell and perform operations. The AMR can continue to move and perform operations as long as the signal including the location identifier is being received. If the signal is no longer received, the AMR stops movement and operation until the signal resumes. The device can transmit signals encoded with location identifiers to grant access to specific workcells, for location confirmation for entering or exiting a structured floor, for access to high-speed areas, to wirelessly cause emergency stops, to control operation of multiple AMRs, to perform dual-domain location confirmation for railroads and other transit systems, and to act as a dock control system for autonomous trailers.

Embodiments of the present disclosure provide various technological advantages over conventional techniques for controlling AMR movement and operations in a facility. For example, transmitting encoded signals that match location identifiers at physical locations in a facility can enable an AMR to safely move within a location and perform operations while the encoded signals are transmitting, even if typical safety protocols are disabled. The device may stop transmitting the signals if an issue is detected. For example, an AMR may be moving containers inside a workcell, and the device may detect that a human has entered a workcell. To prevent a collision between the human and the AMR, the device can cease transmission of the signals, thus preventing the AMR from moving the containers until the human has left the workcell. Multiple AMRs may be controlled by a single device that is transmitting the encoded signals.

Additionally, multiple devices may be present at various zones of a facility to control AMR operations in that particular zone. The devices may transmit encoded signals over any frequency range, such as Wi-Fi frequency ranges or any other wireless protocol and associated radiofrequency range. For example, the devices may transmit the encoded signals on a rapid and periodic basis on a low frequency band (e.g., 125 KHz automotive band). Such low frequency bands may enable multiple devices to be used in facilities because of the limited transmission range of signals. The signals from different devices may therefore be unlikely to interfere with one another but can still be highly reliable within the intended area. Alternatively, in facilities with limited entry points and large areas, higher frequency bands with higher transmission range (e.g., 433 or 925 MHz intermediate frequencies) can be used. In some examples where the signal transmission is unidirectional, the device may not receive feedback from the AMR, which can serve as an efficient use of radio bandwidth.

FIG. 1 illustrates an example of an autonomous mobile robot (AMR) 106 in a facility 100 that includes a workcell 104, according to embodiments of the present disclosure. The facility 100 may be a factory or a warehouse. Various robots, such as the AMR 106, may operate within the facility 100 to move or transport other objects such as containers or carts within the facility 100. As seen in FIG. 1, the facility 100 is divided into a container area 102 and a workcell 104. The workcell 104 includes one or more containers 108 and a robotic arm 110. The workcell 104 may be a confined area. The container area 102 can hold or store multiple containers 108. The container area 102 may be larger and more open compared to the workcell 104.

In certain embodiments, the AMR 106 may operate under different safety protocols depending on the area of the facility 100 the AMR 106 is located. Different areas of the facility 100 may be governed by different safety protocols. In the example of FIG. 1, the facility 100 is divided into a container area 102 and a workcell 104. The AMR 106 may operate within the container area 102 according to a default, programmed first safety mode 112*a*. For example, the first safety mode 124*a* may involve using sensors as part of an object detection system to avoid collision with detected objects.

The workcell 104 can include a robotic arm 110 that operates to move the containers 108 in the workcell 104 or objects within the containers 108 in the workcell 104. The workcell 104 may be smaller and more confined compared to the container area 102. The robotic arm 110 may rotate, swing, or move to grab the containers 108 or objects within the containers 108. Due to the confined nature of the workcell 104 and the movement of the robotic arm 110, the workcell 104 may be governed by a different safety mode than the container area 102. For example, the workcell 104 may be monitored by a safety system 114. The safety system 114 can be a computer system that is local to the workcell 104, or remotely connected to the workcell 104 via one or more networks 116. The safety system 114 can dictate that entities within the workcell 104, such as the robotic arm 110 or the AMR 106, will disable the first safety mode 112*a* or switch from the first safety mode 112*a* to operate under a second safety mode 112*b*.

The safety system 114 can also include or be communicatively coupled to a device 118 positioned outside the workcell 104. The device 118 can be a communication system that can enable the AMR 106 to operate (e.g., enter or perform operations within) the workcell 104. Additionally, a location marker 120 can be installed onto or near the device 118 outside of the workcell 104. The location marker 120 can provide information about a location of the workcell 104. In an example, the location marker 120 displays an identifier corresponding to the workcell 104. For example, the location marker 120 can be a QR code or a two-dimensional barcode that encodes the identifier. The identifier can indicate a particular location (e.g., the location of the workcell 104), or can be a unique (e.g., random) string of numbers. In other examples, the location marker 120 can be a screen or a device that displays the identifier, a transmitter (radio frequency, magnetic, etc.) that can transmit the location marker, or any other system capable of providing the identifier to the AMR 106. The same identifier provided by the location marker 120 can be encoded in a signal 122 that is transmitted by the device 118. The signal 122 can be a radiofrequency signal, an optical signal, a magnetic signal, an image-processing based signal (e.g., an image or a graphic that can be captured and image processed by the AMR 106), or any other type of signal that can transmit data to the AMR 106. The signal 122 can be a permissive signal that can enable the AMR 106 to enter and perform operations within the workcell 104 based on certain conditions being met. In some examples, the signal 122 can be a restrictive signal that can direct the AMR 106 to stop an operation.

In some examples, the AMR 106 can be directed to perform an operation such as entering the workcell 104. In some examples, the command directing the AMR 106 to perform the operation can include a location of the workcell 104. The AMR 106 can move to the location specified in the command. The AMR 106 may approach an entrance 124 of the workcell 104, but the workcell 104 may be a restricted area and the AMR 106 may be unable to enter via the entrance 124. When the AMR 106 approaches the workcell 104, the AMR 106 can interact with the location marker 120 to detect the unique identifier (e.g., scan it or perform an optical read in the case of a fiducial marker such as a QR code or a two-dimensional bar code, receive an RF transmission in the case of an RF transmitter, etc.). For example, the location marker 120 may be a QR code that the AMR 106 detects and scans using an optical sensor to retrieve the unique identifier. In some examples, the command may include an expected identifier for the location of the workcell 104. The AMR 106 can determine if the expected identifier matches the unique identifier of the location marker 120. If the expected identifier matches the unique identifier, the AMR 106 can confirm that the AMR 106 is located in the correct location. But, the AMR 106 may not yet have access to the workcell 104.

Additionally, the safety system 114 can direct the device 118 to transmit the signal 122 after determining that the workcell 104 is unoccupied, the AMR 106 can examine the signal 122 transmitted from the device 118 after detecting the unique identifier in the location marker 120 (or, in examples where the AMR 106 compares the unique identifier to the expected identifier, after determining that the unique identifier matches the expected identifier). In some examples where the command directing the AMR 106 to perform the operation does not include the location of the operation, the AMR 106 may receive the signal 122 before approaching the entrance 124. The AMR 106 may detect another identifier encoded in the signal 122. If the identifier extracted from the signal 122 matches the identifier detected in the location marker 120, the AMR 106 can be permitted to enter the workcell 104 via the entrance 124.

In some examples, the AMR 106 and the device 118 may have two-way communication. For example, the AMR 106 may receive the location of the workcell 104 and an expected identifier in the command instructing the AMR 106 to perform the operation. The AMR 106 may travel to the workcell 104, detect the unique identifier in the location marker 120, and determine a match between the expected identifier and the unique identifier. The device 118 may not be actively transmitting the signal 122 at this time. After the AMR 106 determines the match between the expected identifier and the unique identifier, the AMR 106 can transmit a request to the device 118 requesting the signal 122. In response to the request, the device 118 can begin transmitting the signal 122. The AMR 106 can then detect the other unique identifier encoded in the signal 122, and can enter the workcell 104 if the other identifier matches the expected identifier (and therefore the unique identifier for the location marker 120).

The wavelength of the signal 122 can be selected to minimize interference between workcells based on transmission ranges. The device 118 may transmit the signal 122 at various rates of transmission such once every 1 ms, every 28 ms, etc. depending on the distance between adjacent workcells. For example, the device 118 can transmit the signal 122 at a higher rate but at a narrower bandwidth to limit transmission range. In some examples, the device 118 may receive multiple signals from multiple devices at multiple workcells. To identify the relevant signal 122, the device 118 can process the signal 122 with the highest signal to noise ratio. In other examples, the device 118 can detect a pattern in the signal 122 that corresponds to the unique identifier detected in the location marker 120. The pattern can prompt the AMR 106 to perform further processing on the signal 122 to extract the other identifier.

Figure 2:
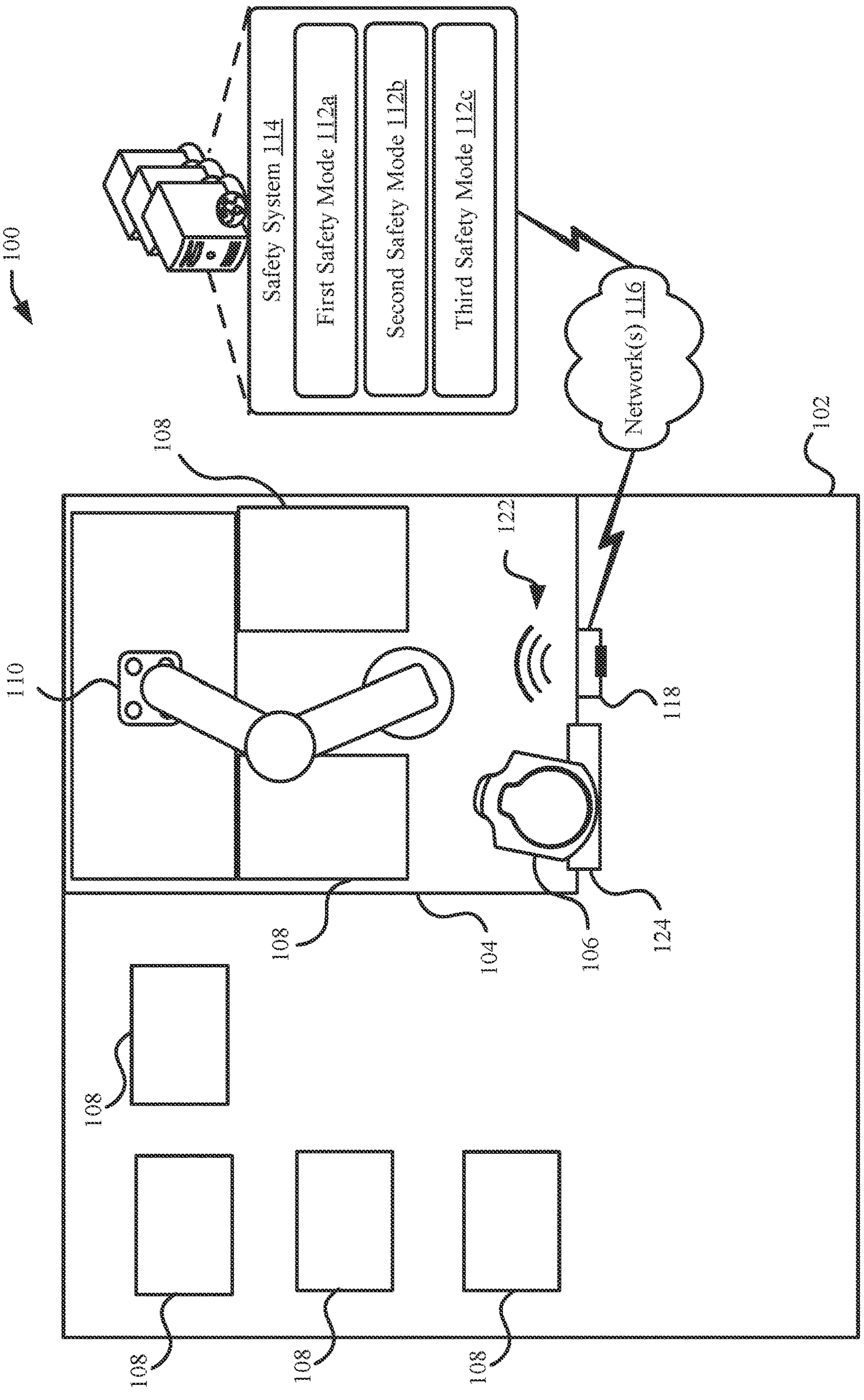
FIG. 2 illustrates an example of the AMR within the workcell in the facility, according to embodiments of the present disclosure.

FIG. 2 illustrates an example of the AMR 106 within the workcell 104 in the facility 100, according to embodiments of the present disclosure. The device 118 can continue to transmit the signal 122 while the AMR 106 is within the workcell 104. The AMR 106 can perform additional operations in the workcell 104, such as moving containers 108, while the AMR 106 receives the signal 122.

The signal 122 may direct the AMR 106 to switch from the first safety mode 112*a* to the second safety mode 112*b* required by the safety system 114. In some examples, the second safety mode 112*b* may involve disabling the object detection system of the first safety mode 112*a* due to the confined nature of the workcell 104. The second safety mode 112*b* may also involve speed restrictions while operations are performed. The safety system 114 can monitor the workcell 104 while the AMR 106 is within the workcell 104. If the safety system 114 does not detect a safety concern, the safety system 114 can transmit a command to the device 118 to enable the device 118 to continue transmitting the signal 122. If the safety system 114 detects a safety concern, such as a human entering the workcell 104, the safety system 114 can transmit a command to the device 118 to stop transmitting the signal 122. In some examples, the safety system 114 can detect safety concerns such as unexpected occupancy of the workcell 104 using a light curtain positioned at the entrance 124. If movement over the entrance 124 is detected by the light curtain, this can indicate that an entity is entering the workcell 104.

In some examples, cessation of the signal 122 can prompt the AMR 106 to enter a third safety mode 112*c*. The safety system 114 may specify the third safety mode 112*c* as ceasing operations, slowing down, and/or exiting the workcell 104. The AMR 106 may also enter the third safety mode 112*c* due to a safety concern detected by the safety system 114. For example, the safety system 114 may detect movement over the entrance 124. In response, the safety system 114 can direct the device 118 to stop transmitting the signal 122. The AMR 106 can determine that the signal 122 has not been received for a certain amount of time (such as amount of time needed for a human to enter the workcell 104, e.g., 2 seconds), which can prompt the AMR 106 to switch operation to the third safety mode 112*c*. Alternatively, the safety system 114 can direct the device 118 to include a command to switch to the third safety mode 112*c* in the signal 122.

Figure 3:
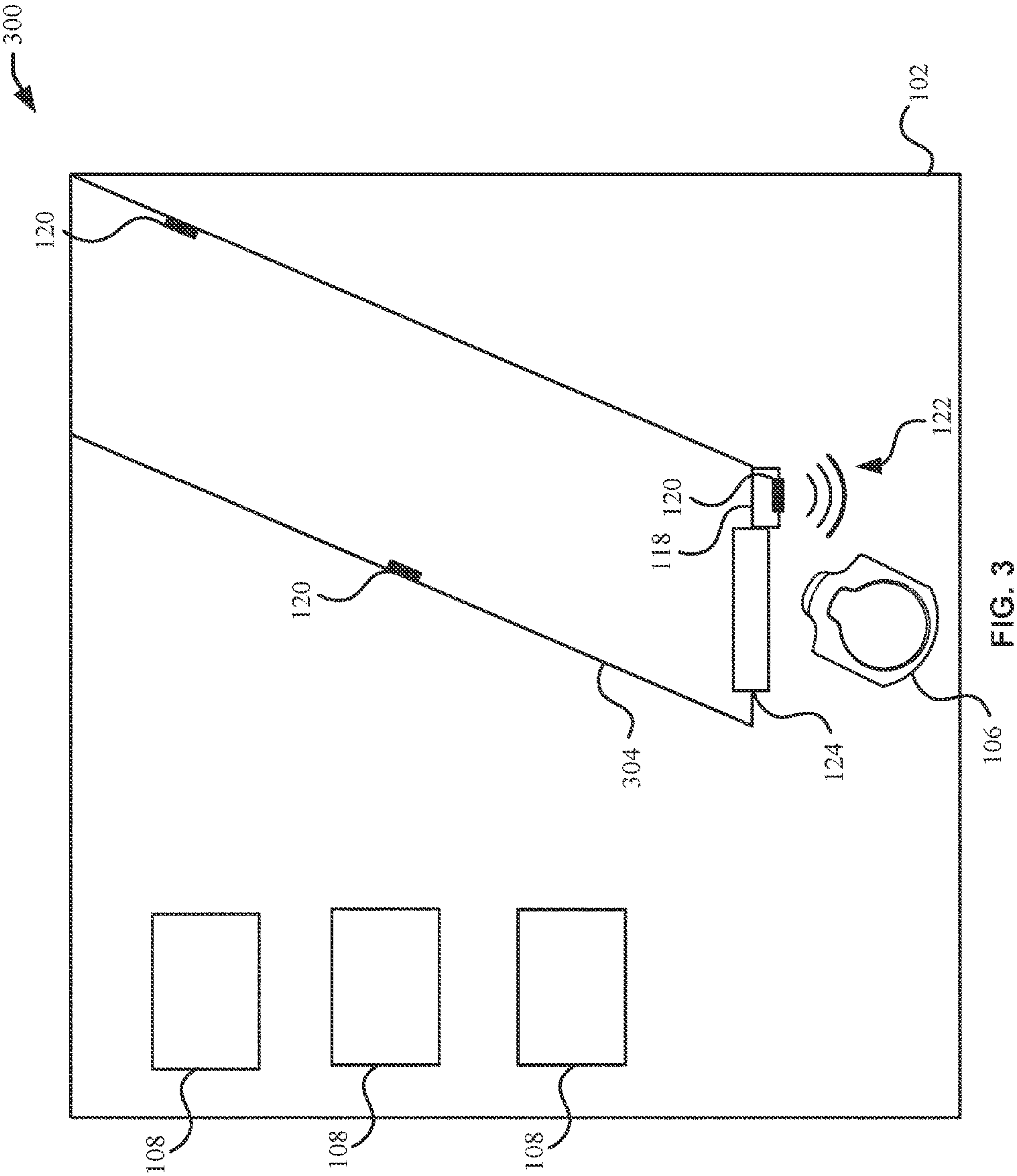
FIG. 3 illustrates an example of an AMR next to a high-speed area in the facility, according to embodiments of the present disclosure.

FIG. 3 illustrates an example of an AMR 106 next to a high-speed area 304 in the facility 100, according to embodiments of the present disclosure. The high-speed area 304 can be a lane in which AMRs can travel at high speeds to another location in the facility 100. As such, the AMR 106 may operate under the first safety mode 112*a* while in the high-speed area 304. Like the workcell 104 of FIGS. 1-2, access to the high-speed area 304 may be controlled by the device 118. The AMR 106 may not enter the high-speed area 304 until the AMR 106 determines that an identifier detected in a location marker 120 matches an identifier encoded in a signal 122 transmit by the device 118. Unlike in the workcell 104, the AMR 106 may remain in the first safety mode 112*a* within the high-speed area 304. Or, the AMR 106 may remain in a modified version of the first safety mode 112*a*. For example, the first safety mode 112*a* may involve using an obstacle detection program. Because the AMR 106 is not authorized to enter the high-speed area 304 until the safety system 114 determines that it is safe for the AMR 106 to enter the high-speed area 304, the AMR 106 may use a modified first safety mode 112*a* while traveling in the high-speed area 304. The modified first safety mode 112*a* can involve only using the obstacle detection program for objects in front of the AMR 106 (e.g., in the travel direction). Obstacles to the side of the AMR 106 (e.g., the walls of the high-speed area 304) need not be detected by the AMR 106.

But, the signal 122 may override the first safety mode 112*a* such that the signal 122 no longer being transmit can prevent the AMR 106 from performing operations in the high-speed area 304. For example, if the device 118 stops transmitting the signal 122, the AMR 106 may enter a third safety mode 112*c* in which the AMR 106 moves at lower speeds. Or, the AMR 106 may exit the high-speed area 304 through the entrance 124 rather than traveling to the intended location. Alternatively, the AMR 106 may remain in place until the signal 122 is transmit again.

In some examples, the high-speed area 304 can include multiple location markers 120 that display the identifier. The AMR 106 may scan a location marker 120 within the high-speed area 304 to determine the identifier before passing the location marker 120. If the identifier detected in the location marker 120 matches the identifier detected in the signal 122, the AMR 106 can continue traveling along the high-speed area 304. If the identifier detected in the location marker 120 does not match the identifier detected in the signal 122, the AMR 106 can exit the high-speed area 304 or cease operations. The location markers 120 within the high-speed area 304 can give continued assurance that the AMR 106 can operate in the first safety mode 112*a* (or the modified first safety mode 112*a*).

Figure 4:
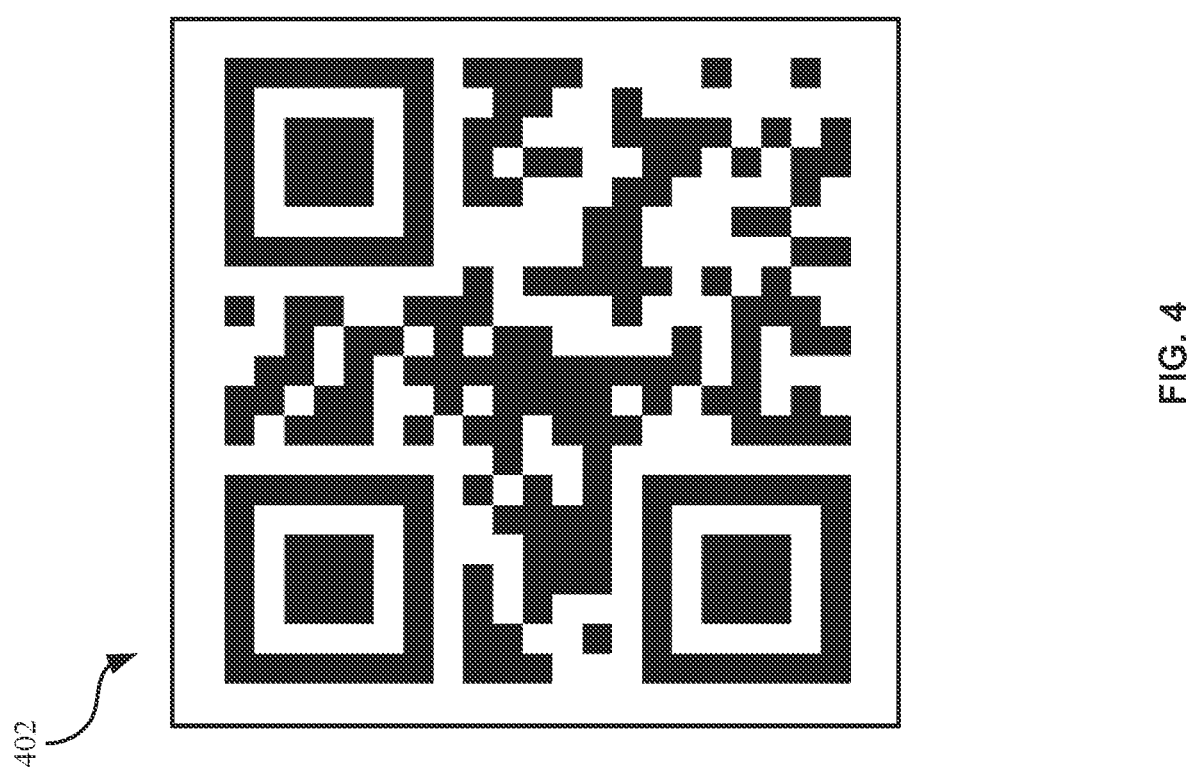

FIG. 4 illustrates a location marker 402 for the workcell 104 of FIG. 1 or the high-speed area 304 of FIG. 4, according to embodiments of the present disclosure. The location marker 402 can encode the identifier using various methods. For example, as depicted in FIG. 4, the location marker 402 can be a fiducial marker such as a QR code in which the identifier is encoded. In other examples, the location marker 402 may be a barcode, matrix code, or text displaying the identifier. The fiducial marker may also encode data integrity information associated with the location of the workcell 402, the unique identifier, the device 118, the fiducial marker, etc. The data integrity information can include cyclic redundant checks, pre-defined data (e.g., data known to the AMR 106), a hash of the location, or any other data associated with the location or identifier. Whereas the QR code can ensure an integrity of the QR scan, the AMR 106 may use the data integrity information to determine that the identifier derived from the QR scanning is read at a high level of integrity (e.g., with low risk of error and/or tampering). In one example, the data integrity information can include a cyclic redundant check associated with the location identifier. When the AMR 106 decodes the location identifier via image processing, the AMR 106 can also decode the cyclic redundant check to determine that the location identifier was correctly decoded. In other examples, similar associations between data integrity information and identifiers can be used for the device 118, the fiducial marker, etc. and can include cyclic redundant checks, predefined data, hashe(s) of the identifier(s), etc. The location marker 402 may be printed and attached on or near the device 118. Alternatively, the location marker 402 can be a display such as an LCD display, an LED panel, an array of LEDs, an e-ink screen, or any other type of display. In some examples, the location marker 402 may not be a visual marker. For example, the location marker 402 may be an RFID reader, an NFC transmitter, a magenta transmitter, etc.

The location marker 402 may also be a visible light communication channel that communicates modulated light. For example, one or more strips of LEDs may be placed at a perimeter of the workcell 104 or the high-speed area 304. The LED strips may be modulated at high speeds with the encoded identifier. Using the LED strips may allow the AMR 106 to perform a constant comparison between the identifier detected from the LED strips and the identifier detected from the signal 122.

In some examples, the location marker 402 may include a microprocessor that can modify the encoding of the identifier periodically to increase security. The location marker 402 can transmit the modified encoded identifier to the device 118 so that the device 118 can transmit the modified encoded identifier in the signal 122. Alternatively, the device 118 may transmit a modified identifier to the location marker 402, and the location marker 402 can update the displayed encoded identifier accordingly. The location marker 402 may also be integrated into the device 118.

Figure 5:
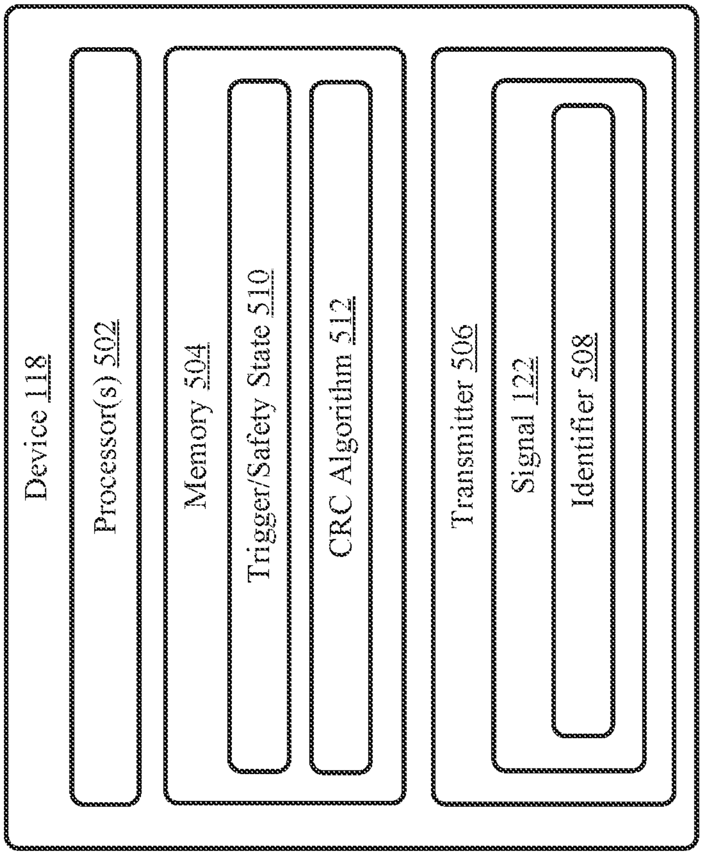
FIG. 5 illustrates a device for controlling movement of the AMR, according to embodiments of the present disclosure.

FIG. 5 illustrates the device 118 for controlling movement of the AMR 106, according to embodiments of the present disclosure. The device 118 can include one or more processors 502, one or more memories 504, and a transmitter 506. In some examples, the transmitter 506 may be a transceiver. The transmitter 506 can transmit the signal 122 that includes the encoded identifier 508. The memory 504 can store instructions that can be executed by the processor 502. For example, the processor 502 can detect a trigger and/or a safety state 510. Detection of the trigger and/or safety state 510 can cause the transmitter 506 to transmit the signal 122. In some examples, a safety state can be determined based on the safety system 114 of FIG. 1. For example, the device 118 may include a pin. The processor 502 can detect that the safety system 114 has set a voltage for the pin, indicating that the device 118 is authorized to transmit the signal 122. In another example, the device 118 may include a network interface card (NIC). The processor 502 can use the NIC to detect status data transmitted by the safety system 114. The status data can be mapped to a safety state (e.g., safe or unsafe, or any other variation). In turn, the safety state (e.g., safe) can indicate the authorization of the transmission of the signal 122. A trigger can be based on a type of communications with the AMR 106. For example, in a two-way communication approach, the AMR 160 may request the transmission of the signal 122. This request can be a first trigger. The device 118 can also validate that the AMR 160 is authorized to receive the signal 122. This validation can be an example of a second trigger. The validation can be based at least in part on input from the safety system 114 (or another system) identifying the AMR 160 specifically or indicating that an AMR is expected to operate in the workcell.

The processor 502 can also encode the identifier 508 into the signal 122. The encoding can use a data integrity measure such as cyclic redundancy checks (CRC) or error correction codes. This can ensure that the identifier 508 is not mistaken for another identifier for another workcell or high-speed area. The processor 502 can use a CRC algorithm 512 that is also used by the AMR 106. So, when the AMR 106 received the signal 122, the AMR 106 can decode the signal 122, check the decoded signal against the CRC algorithm 512, and determine that the identifier 508 is valid. This can also aid in preventing interference between different workcells or high-speed areas. The processor 502 can also set transmission rates, power levels, and frequencies of the signal 122.

Figure 6:
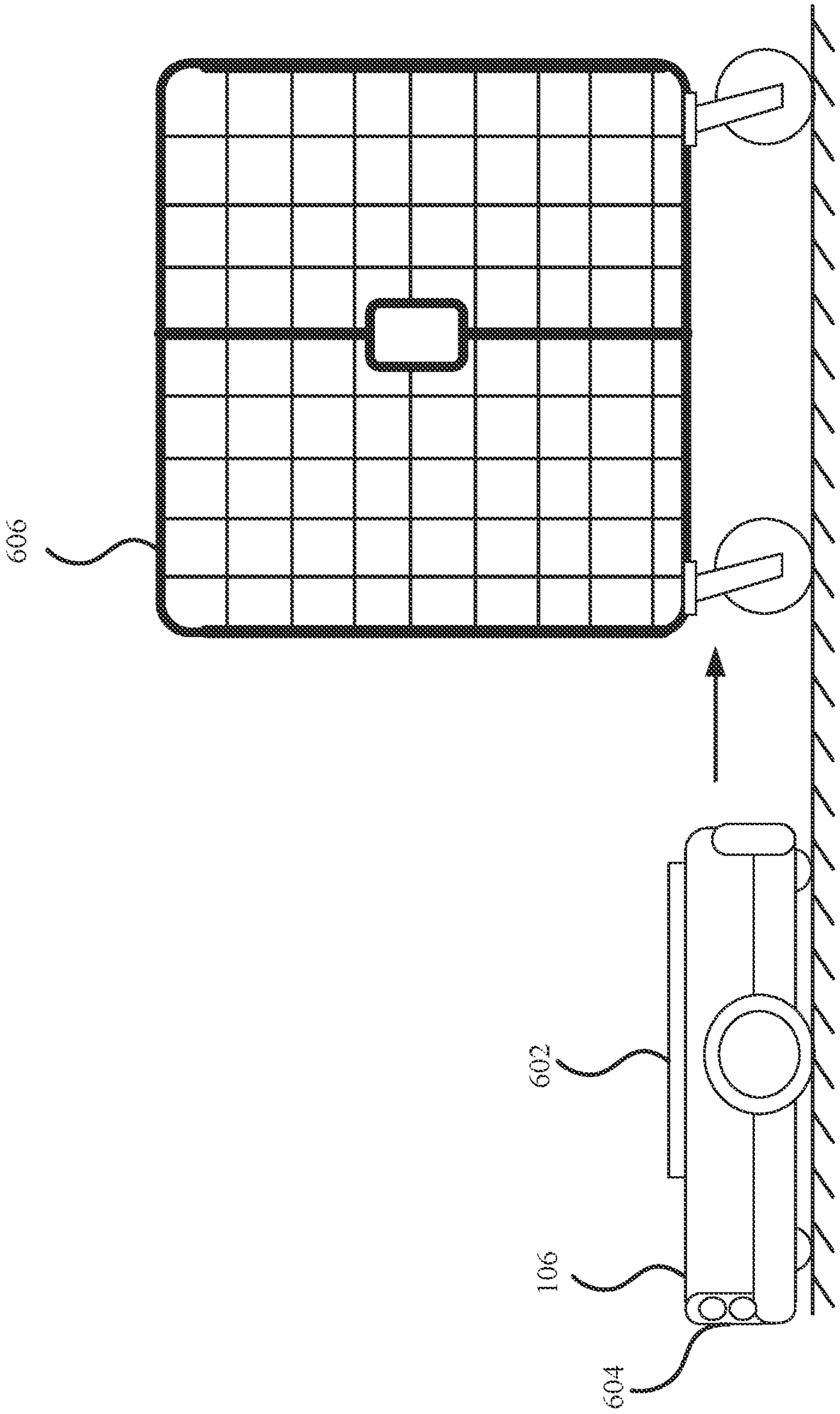
FIG. 6 illustrates an AMR, according to embodiments of the present disclosure.

FIG. 6 illustrates an AMR 106, according to embodiments of the present disclosure. Specifically, FIG. 6 illustrates the operation of the AMR 106 with respect to a cart 606. Generally, the AMR 106 may move underneath the cart 606 and then lift the cart 606 to move or transport the cart 606. In the example of FIG. 6, the AMR 106 includes a platform 602. When the AMR 106 moved underneath the cart 606, the AMR 106 may raise the platform 202 to lift the cart 606. After the cart 606 is lifted, the AMR 106 may move to move or transport the cart 606.

The AMR 106 may include any suitable mechanism for lifting or grabbing the cart 606 so that the AMR 106 may move or transport the cart 606. For example, the AMR 106 may include an arm or a grabber that grabs or lifts the cart 606. As another example, the AMR 106 may include a ramp that lifts the cart 606.

The AMR 106 may also include a sensor 604. The sensor 604 can include a receiver (e.g., a radiofrequency receiver) that can receive the signal 122 from the device 118. The sensor 604 can also include another sensor (e.g., an optical sensor, a radiofrequency transceiver, a magnetic sensor, etc.) that can read or determine a signal of the location marker 120. The AMR 106 can compare a first identifier detected from the signal 122 to a second identifier detected from the location marker 120. If the first identifier matches the second identifier, the AMR 106 can determine permission to perform operations in the physical location associated with the location marker 120. In some examples, the signal 122 can also indicate a safety mode that the AMR 106 should operate under while located in the physical location.

In some examples, the location marker 120 can be a fiducial marker such as a barcode that can encode a location identifier for the workcell 104 or high-speed area 304. The fiducial marker can also encode dimension data. The AMR 106 can use the sensor 604 to scan the fiducial marker and generate an image of the fiducial marker. The AMR 106 can use the image to identify the location identifier and the dimension data. The dimension data can be used to determine a proximity (e.g., a distance) between the AMR 106 and the fiducial marker. If the proximity is within a proximity threshold (e.g., the AMR 106 is close enough to the fiducial marker), the AMR 106 can determine that the location identifier from the fiducial marker can be used to determine a match with another location identifier from the signal 122. That is, in such examples the AMR 106 may only compare location identifiers to determine a match between location identifiers to enable performance of operations if the AMR 106 is within a threshold distance of the location marker 120. The AMR 106 may move closer to the location marker 120 to identify the location identifier within the proximity threshold.

In other examples, the AMR 106 may be further restricted in matching identifiers based on a time in which identifiers are determined. For example, the AMR 106 may determine a first identifier from the location marker 120 at a first time, and a second identifier from the signal 122 at a second time. If a time difference between the first time and the second time is within a time threshold, the AMR 106 can determine the match between the first identifier and the second identifier to enable operations. If the time difference between the first time and the second time is not within the time threshold, the AMR 106 may not match the first identifier and the second identifier.

Figure 7:
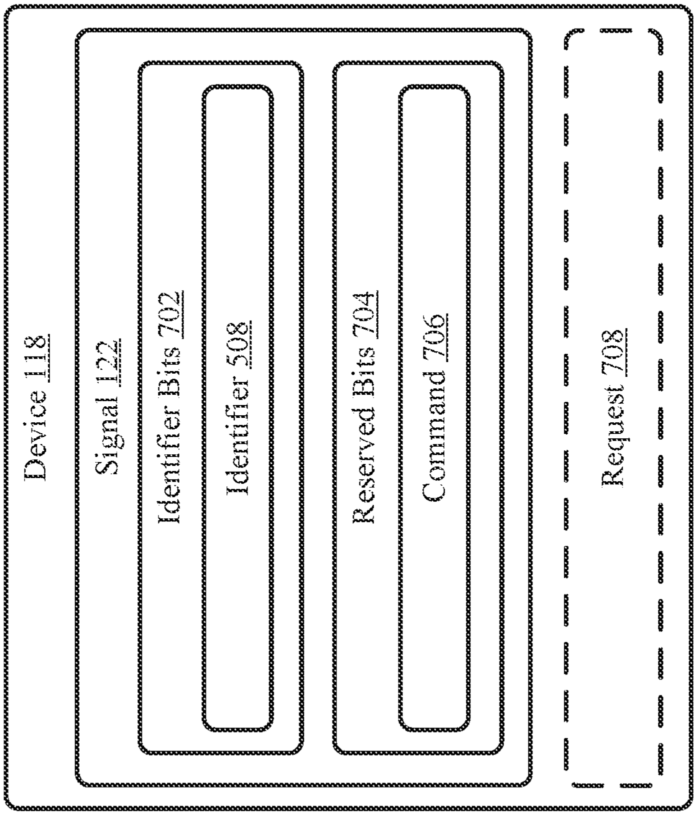
FIG. 7 illustrates a signal transmitted by the device, according to embodiments of the present disclosure.

FIG. 7 illustrates a signal 122 transmitted by the device 118, according to embodiments of the present disclosure. The signal 122 can include identifier bits 702 in which the identifier 508 is encoded. In some examples, the signal 122 can also include reserved bits 704 that are not used to encode the identifier 508. The reserved bits 704 can be used to transmit additional commands 706 to the AMR 106. For example, the command 706 can direct the AMR 106 to switch to a different safety mode. If the AMR 106 is entering a workcell 104, the command 706 may direct the AMR 106 to switch from a first safety mode 112*a* in which the AMR 106 moves at high speeds to a second safety mode 112*b* in which the AMR 106 is limited to moving at lower speeds. The command 706 can also include the operations to be performed by the AMR 106. For example, the command 706 can direct the AMR 106 to move a container 108 from a first location to a second location. Or, the command 706 can direct the AMR 106 to enter a restricted area such as a high-speed area 304.

Figure 8:
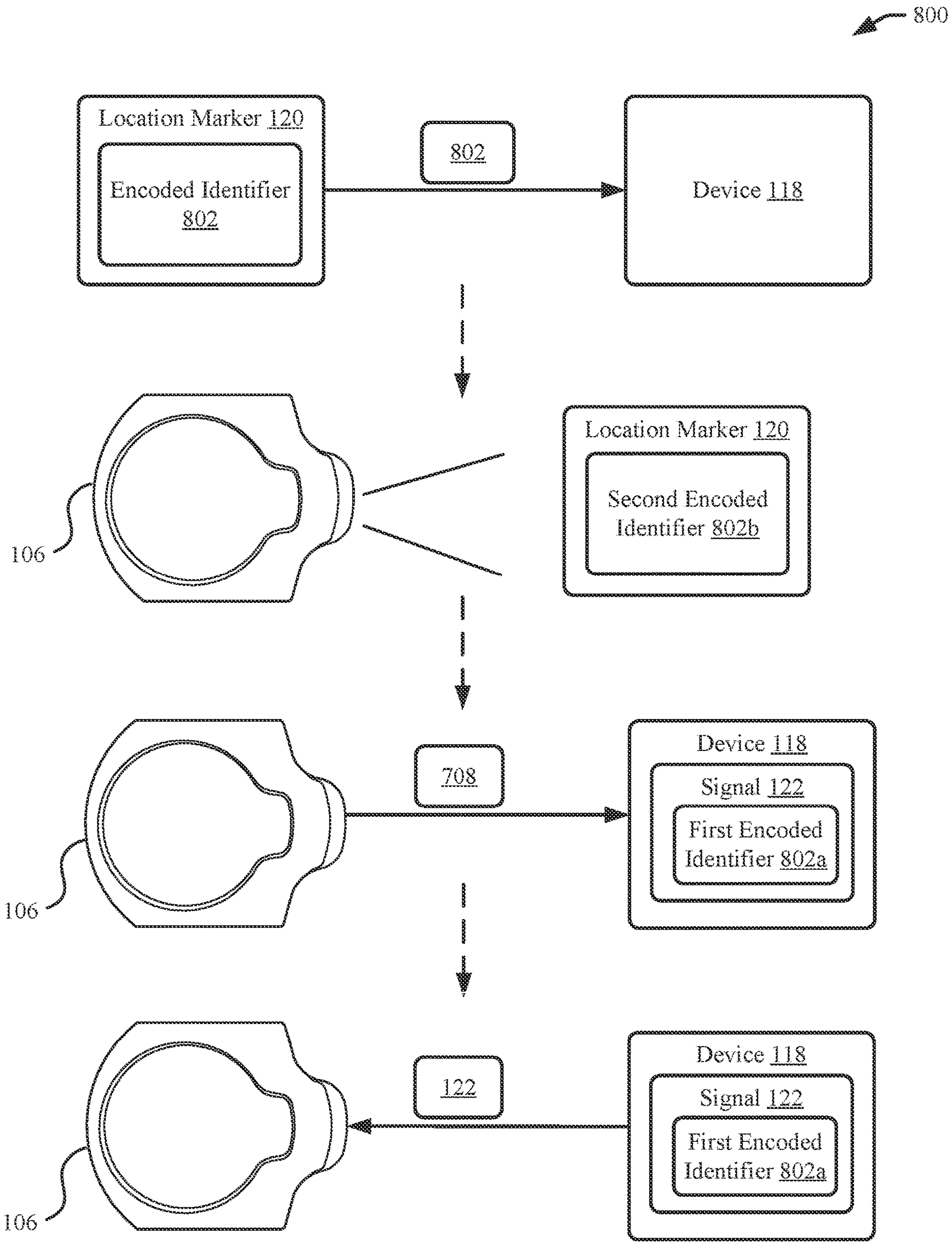
FIG. 8 illustrates a sequence diagram depicting the AMR, the device, and the location identifier; according to embodiments of the present disclosure.

In examples with one-way communication between the device 118 and the AMR 106, the device 118 may broadcast the signal 122 in response to instruction from the safety system 114, or in response to detecting a trigger. In examples with two-way communication between the device 118 and the AMR 106, the device 118 may receive a request 708 from the AMR 106 for the signal 122. The AMR 106 may transmit the request 708 after identifying the unique identifier for the location marker 120. The device 118 can respond to the request 708 by transmitting the signal 122. The request 708 can include information about the AMR 106 (e.g., an identifier thereof) and/or information about the location (e.g., the identifier that the AMR 106 read from the location marker). The device 110 can use any or all of such information to confirm that the AMR 106 is validly present at the location and/or is authorized to receive the signal 122. Based on this validation and/or authorization, the device 118 can send the signal 122 to the AMR 106. FIG. 8 illustrates a sequence diagram 800 depicting the AMR 106, the device 118, and the location marker 120, according to embodiments of the present disclosure. The location marker 120 and the device 118 can each be installed at a physical location, such as at the workcell 104 of FIG. 1 or the high-speed area 304 of FIG. 4. The location marker 120 can generate an encoded identifier 802 by encoding an identifier for the physical location. Initially, the location marker 120 can transmit the encoded identifier 802 to the device 118. This can ensure that location identifiers output by the location marker 120 and the device 118 can match. Then, the device 118 can include the encoded identifier 802 (e.g., the first encoded identifier 802*a*) in a signal 122. Initially, the device 118 may not transmit the signal 122.

The AMR 106 may detect the location marker 120. The location marker 120 may display the encoded identifier 802 (e.g., the second encoded identifier 802*b*). The AMR 106 may scan the location marker 120 to extract the second encoded identifier 802*b*. Once, the AMR 106 has detected the second encoded identifier 802*b*, the AMR 106 can be authorized to request the signal 122 from the device 118. For example, the AMR 106 can transmit the request 708 to the device 118. In response, the device 118 can transmit the first encoded identifier 802 in the signal to the AMR 106.

The signal 122 may be one signal of many signals received by the AMR 106. Based on the second encoded identifier 802*b*, the AMR 106 can select the signal 122 including the first encoded identifier 802*a* to process. For example, the AMR 106 may determine that the second encoded identifier 802*b* includes an indication (e.g., a pattern) that can be used to select the signal 122 amongst the multiple received signals. The AMR 106 can then process the signal 122 to detect the second encoded identifier 802*b*. If the AMR 106 determined the first encoded identifier 802*a* and second encoded identifier 802*b* within a threshold amount of time, and if the AMR 106 is positioned within a proximity threshold of the location marker 120, the AMR 106 can determine if the first encoded identifier 802*a* matches the second encoded identifier 802*b*. If the AMR 106 determines the match, the AMR 106 can be authorized to perform operations at the physical location.

Flows are described in connection with the next figures. Operations of the example flows can be implemented by a system (which may include any of the devices described herein above and/or any remote computer system described herein above). Instructions for performing the operations can be stored as computer-readable instructions on a non-transitory computer-readable medium of the system. As stored, the instructions represent programmable modules that include code executable by a processor(s) of the system. The execution of such instructions configures the system to perform the specific operations shown in the figures and described herein. Each programmable module in combination with the processor represents a means for performing a respective operation(s). While the operations are illustrated in a particular order, it should be understood that no particular order is required.

FIG. 9 shows an example of a flow 900 for controlling AMR movement based on transmitting encoded signals, according to embodiments of the present disclosure. In an example, the flow 900 includes operation 902, involving determining, by a device, a safety state of a physical location indicating a permission to transmit signals. The safety state can be associated with an operation that can be performed at the physical location. The device can be associated with the physical location. The trigger may be based at least in part on an occupancy of the physical location. For example, if the physical location is a workcell, the safety state may involve the workcell being unoccupied. If the physical location is a high-speed area, the safety state may involve the high-speed area being free of containers. The trigger may be associated with a safety mode of the AMR.

In an example, the flow 900 includes operation 904, involving transmitting, by the device, a first signal that includes a first identifier at a first time based at least in part on the trigger. The first identifier can match a second identifier available to an AMR from a location marker associated with the physical location. The first signal can include a first set of bits that represent the first identifier and a second set of bits that represent a command indicating the operation to be performed. In some examples, the device may transmit the first signal at the first time based at least in part on a request from the AMR. The device may receive the request to transmit the first signal that indicates the first identifier after the AMR identifies the second identifier from the location marker.

In an example, the flow 900 includes operation 906, involving transmitting, at a second time and by the device, a second signal that indicates the first identifier. The first signal and the second signal can enable the AMR to perform the operation. For example, the AMR can continue performing the operation while the second signal that indicates the first identifier is being transmitted.

In an example, the flow 900 includes operation 908, involving determining, by the device, another trigger to stop transmitting the signals. For example, the trigger may involve a potentially dangerous situation such as a human or an unexpected object entering the physical location. In an example, the flow 900 includes operation 910, involving forgoing, based at least in part on the other trigger and by the device, a transmission at a third time of a third signal that indicates the first identifier. Forgoing the transmission can cause the AMR to stop the operation.

FIG. 10 shows an example of a flow 1000 for AMR movement based on location identifiers and encoded signals, according to embodiments of the present disclosure. In an example, the flow 1000 includes operation 1002, involving determining, by an AMR, a first identifier based at least in part on a first signal associated with a location marker. The location marker can be associated with a physical location, such as a workcell or a high-speed area. The location marker can be installed at the physical location and can encode the first identifier in the first signal. The AMR can determine the first identifier based at least in part on an optical read of the location marker. The location marker may be a fiducial marker that encodes the first identifier and is attached to the device. In some examples, the fiducial marker may also encode dimension data. The AMR can scan the fiducial marker to generate an image of the fiducial marker. The AMR can determine the dimension data and the first identifier based at least in part on the image. The AMR can determine proximity to the fiducial marker based at least in part on the fiducial marker.

In an example, the flow 1000 includes operation 1004, involving receiving, by the AMR, a second signal transmitted by a device. The device can be associated with and installed at the physical location. In some examples, the location marker and the device can be co-located at an entrance of the physical location. The second signal can indicate a second identifier. The second signal can also indicate a permission for the AMR to operate in the physical location based at least in part on an occupancy of the physical location. The AMR can receive the second signal and can determine the second identifier based at least in part on the second signal.

In an example, the flow 1000 includes operation 1006, involving determining, by the AMR, a match between the first identifier and the second identifier. Based at least in part on the match, the AMR can determine the permission indicated in the signal. The AMR can determine that the first identifier is usable for matching with the second identifier based at least in part on the proximity being within a proximity threshold. The proximity can be to at least one of the location marker, the device, or the physical location. The proximity can be determined at least in part based on the first signal. At least one of the first identifier or the second identifier can be used to determine the match based at least in part on the proximity.

In an example, the flow 1000 includes operation 1008, involving determining, based at least in part on the match and by the AMR, that an operation is to be performed at the physical location. The AMR can determine that the operation is permitted at the physical location based at least in part on the permission. The operation may involve entry into the physical location via the entrance. For example, the AMR can determine, based at least in part on the match, that the second signal indicates a permission to perform the operation. The operation can include at least one of entry into the physical location or movement within the physical location. In an example, the flow 1000 includes operation 1010, involving performing, by the AMR, the operation at the physical location. The AMR can perform the operation based at least in part on the operation being permitted. In some examples, based at least in part on the match, the AMR can determine a command indicated in the second signal. The AMR may perform the command by at least switching to a safety mode or starting the operation.

In some examples, the AMR may switch, based at least in part on the match, from operating in a first safety mode to operating in a second safety mode. The operation may be performed while the AMR is operating in the second safety mode. The AMR can receive a third signal transmitted by the device. The third signal can indicate a third identifier. The AMR can determine another match between the first identifier and the third identifier. Because the other match is determined, the AMR can continue to operate in the second safety mode. The operation can continue to be performed, or another operation may be performed, by the AMR at the physical location while operating in the second safety mode.

In some examples, the operation, the match, the device, and the physical location can be a first operation, a first match, a first device, and a first physical location, respectively. The AMR can determine, based at least in part on the first match, that the second signal indicates a permission to perform the first operation while the AMR is operating in a first safety mode. The AMR can then receive, while being outside of the first physical location, a third signal transmitted by a second device that is associated with a second physical location. The AMR can determine a second match between a third identifier indicated by a third signal and a fourth identifier associated with the second location. The AMR can then perform, based at least in part on the second match, a second operation at the second physical location while the AMR is operating in a second safety mode.

FIG. 11 shows an example of a flow 1100 for AMR movement based on location identifiers and encoded signals in a workcell, according to embodiments of the present disclosure. In an example, the flow 1100 includes operation 1102, involving determining, by an AMR, that an identifier associated with a physical location (e.g., a workcell) is expected. For example, the AMR may receive a command directing the AMR to perform an operation at a workcell that has an expected identifier. The operation may be entering the workcell, which can be a restricted area.

In an example, the flow 1100 includes operation 1104, involving determining, by the AMR, a second identifier by reading a location identifier at a workcell. For example, the AMR may move to and detect a nearby location identifier for a nearby workcell. The AMR may use an optical scanner to read the location identifier (e.g., receive a first signal). In an example, the flow 1100 includes operation 1106, involving matching, by the AMR, the expected identifier (e.g., first identifier) with the read identifier (e.g., second identifier) to determine that the current workcell is the correct workcell. That is, the AMR can determine that the AMR is located at the workcell at which the AMR has been commanded to perform the operation. Thus, either the expected identifier or the read identifier can be used to determine another match between another identifier. If the expected identifier does not match the read identifier, the AMR can determine that the AMR is not located at the correct location. Thus, the AMR can move to another workcell with another location identifier to repeat operations 1104 and 1106 until a match is determined.

In an example, the flow 1100 includes operation 1108, involving receiving, by the AMR, multiple signals that include identifiers. The multiple signals can be sent from various devices, including devices installed at different high-speed areas or workcells. Each signal can include an identifier for the location associated with the particular device transmitting the signal, including a second signal transmitted from a device associated with the workcell at which the AMR has been directed to perform the operation. However, the multiple signals may also include signals from devices at irrelevant locations.

In an example, the flow 1100 includes operation 1110, involving filtering out, by the AMR, signals that do not include the first identifier. For example, the AMR can receive a third signal transmitted from a different device associated with a different physical location, indicating a third identifier. The AMR can determine that the third identifier does not match the expected identifier (e.g., first identifier). Because the third identifier does not match the expected identifier, the AMR can forgo using the third signal to determine whether a different operation is to be performed. Signals that do not match the expected identifier can be filtered out.

In an example, the flow 1100 includes operation 1112, involving processing, by the AMR, at least one signal that includes the first identifier based on the signal being received and the second identifier being detected within a threshold time. For example, the first signal (e.g., reading the location identifier for the workcell) may be determined at a first time. The second signal (e.g., the signal encoded with the identifier and transmitted by the device located at the workcell) may be determined at a second time. The AMR may determine a time difference between the first time and the second time. If the time difference is within a threshold time, the AMR can process the at least one signal to determine a match between the first identifier and the second identifier can grant the AMR permission to perform the operation. If the time difference is not within the threshold time, the AMR may not process the signal, even if the first identifier matches the second identifier.

In an example, the flow 1100 includes operation 1114, involving determining, by the AMR, permission to perform the operation at the workcell based on the signal processing. The AMR can have the permission on the time difference being within the threshold time and the first identifier matching the second identifier. In an example, the flow 1100 includes operation 1116, involving switching the AMR from operating in the first safety mode to operating in the second safety mode. The operation (e.g., entering the workcell) may be performed while the AMR is operating in the second safety mode. For example, the first safety mode may allow the AMR to move at relatively high speeds outside of the workcell. However, the second safety mode may restrict the AMR to move at lower speeds to increase safety in the enclosed workcell.

Figure 12:
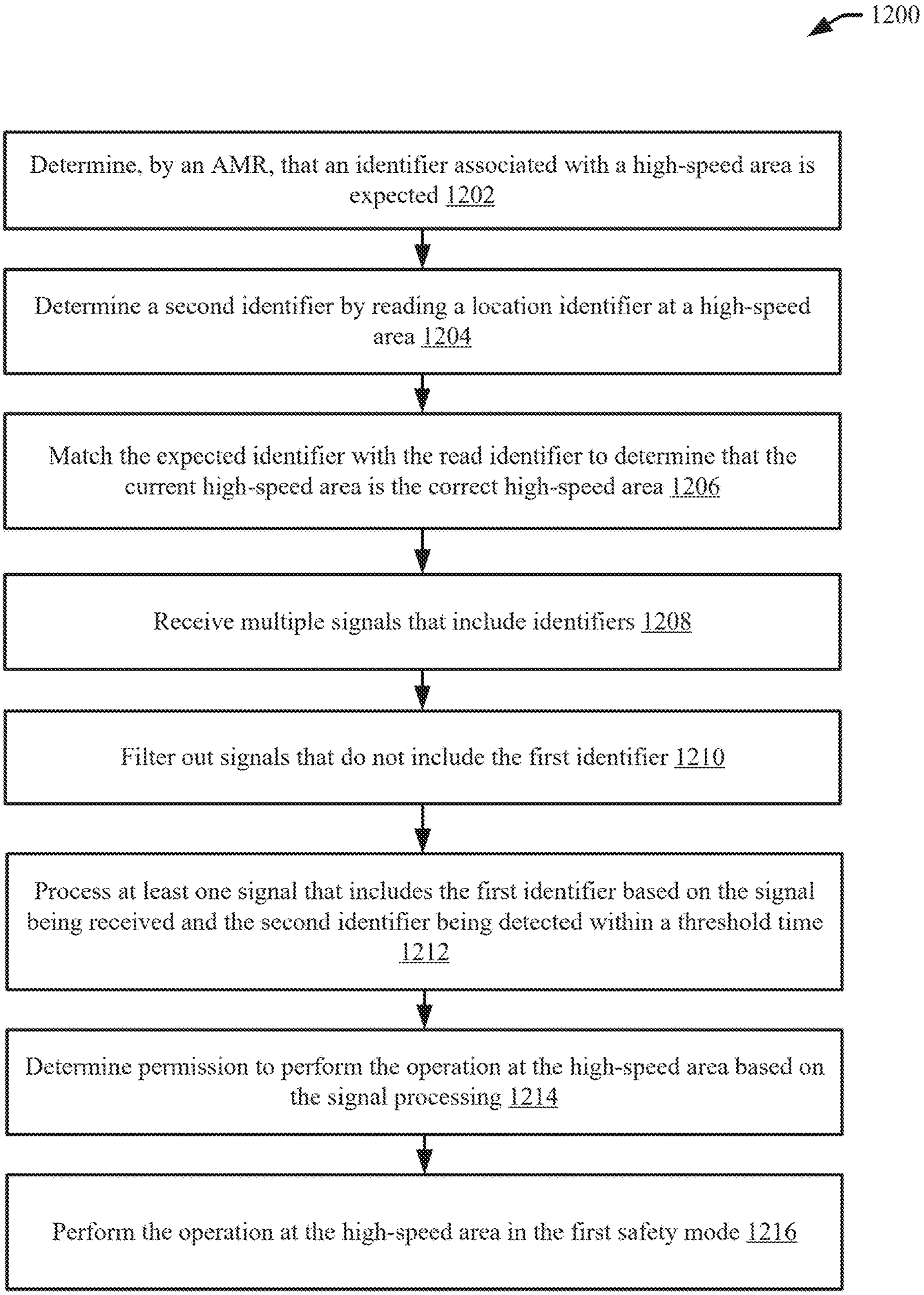
FIG. 12 shows an example of a flow for AMR movement based on location identifiers and encoded signals in a high-speed area, according to embodiments of the present disclosure.

FIG. 12 shows an example of a flow 1200 for AMR movement based on location identifiers and encoded signals in a high-speed area, according to embodiments of the present disclosure. In an example, the flow 1200 includes operation 1202, involving determining, by an AMR that an identifier associated with a physical location (e.g., a high-speed area) is expected. For example, the AMR may receive a command directing the AMR to perform an operation at a high-speed area that has an expected identifier. The operation may be travelling to a location within the high-speed area, which may be a restricted area.

In an example, the flow 1200 includes operation 1204, involving determining, by the AMR, a second identifier by reading a location identifier at a high-speed area. For example, the AMR may move to and detect a nearby location identifier for a nearby high-speed area. The AMR may use an optical scanner to read the location identifier (e.g., receive a first signal). In an example, the flow 1200 includes operation 1206, involving matching, by the AMR, the expected identifier (e.g., first identifier) with the read identifier (e.g., second identifier) to determine that the current high-speed area is the correct high-speed area. That is, the AMR can determine that the AMR is located at the high-speed area at which the AMR has been commanded to perform the operation. Thus, either the expected identifier or the read identifier can be used to determine another match between another identifier. If the expected identifier does not match the read identifier, the AMR can determine that the AMR is not located at the correct location. Thus, the AMR can move to another high-speed area with another location identifier to repeat operations 1204 and 1206 until a match is determined.

In an example, the flow 1200 includes operation 1208, involving receiving, by the AMR, multiple signals that include identifiers. The multiple signals can be sent from various devices, including devices installed at different high-speed areas or workcells. Each signal can include an identifier for the location associated with the particular device transmitting the signal, including a second signal transmitted from a device associated with the high-speed area at which the AMR has been directed to perform the operation. However, the multiple signals may also include signals from devices at irrelevant locations.

In an example, the flow 1200 includes operation 1210, involving filtering out, by the AMR, signals that do not include the first identifier. For example, the AMR can receive a third signal transmitted from a different device associated with a different physical location, indicating a third identifier. The AMR can determine that the third identifier does not match the expected identifier (e.g., first identifier). Because the third identifier does not match the expected identifier, the AMR can forgo using the third signal to determine whether a different operation is to be performed. Signals that do not match the expected identifier can be filtered out.

In an example, the flow 1200 includes operation 1212, involving processing, by the AMR, at least one signal that includes the first identifier based on the signal being received and the second identifier being detected within a threshold time. For example, the first signal (e.g., reading the location identifier for the high-speed area) may be determined at a first time. The second signal (e.g., the signal encoded with the identifier and transmitted by the device located at the high-speed area) may be determined at a second time. The AMR may determine a time difference between the first time and the second time. If the time difference is within a threshold time, the AMR can process the at least one signal to determine a match between the first identifier and the second identifier can grant the AMR permission to perform the operation. If the time difference is not within the threshold time, the AMR may not process the signal, even if the first identifier matches the second identifier.

In an example, the flow 1200 includes operation 1214, involving determining, by the AMR, permission to perform the operation at the high-speed area based on the signal processing. The AMR can have the permission on the time difference being within the threshold time and the first identifier matching the second identifier. In an example, the flow 1200 includes operation 1216, involving performing, by the AMR, the operation at the high-speed area in the first safety mode. For example, the AMR can determine, based at least in part on the match, that the second signal indicates a permission to perform the operation (e.g., travel in the high-speed area) in the first safety mode. That is, the AMR may travel at high speeds within the high-speed area.

Figure 13:
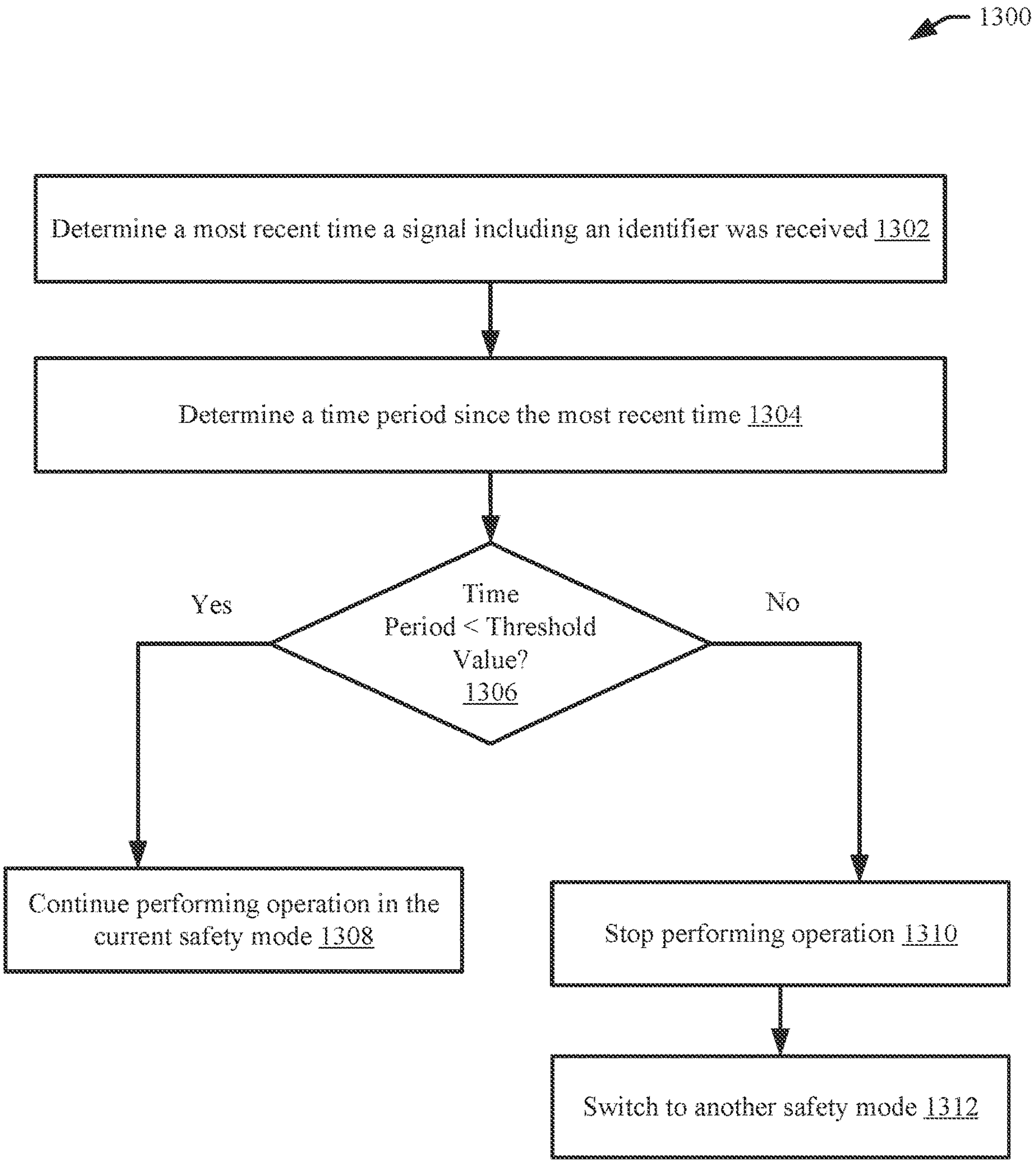
FIG. 13 shows an example of a flow for AMR movement in the absence of encoded signals, according to embodiments of the present disclosure.

FIG. 13 shows an example of a flow 1300 for AMR movement in the absence of encoded signals, according to embodiments of the present disclosure. In an example, the flow 1300 can include operation 1302, involving determining, by an AMR, a most recent time a signal including an identifier was received. The AMR may be performing an operation in a physical location. The AMR may be authorized to perform the operation based on continuously receiving the signal which includes an identifier that matches another identifier detected by the AMR. Before the AMR entered the physical location, the AMR may operate in a first safety mode. While the AMR is performing the operation, the AMR may be operating in a second safety mode dictated by the signal. For example, the second safety mode may dictate the speed at which the AMR can move. The speed in the second safety mode may be less than the speed in the first safety mode.

In an example, the flow 1300 can include operation 1304, involving determining, by the AMR, a time period since the most recent time. In an example, the flow 1300 can include operation 1306, involving determining, by the AMR, if the time period exceeds a threshold value. For example, the threshold value may be 2 seconds. If the time period does not exceed the threshold value, the flow 1300 can continue to operation 1308. If the time period does exceed the threshold value, the flow 1300 can continue to operation 1310.

In an example, the flow 1300 can include operation 1308, involving the AMR continuing to perform the operation in the current safety mode (e.g., the second safety mode). The AMR can continue to perform the operation while the signal including the identifier is continuously received (e.g., received in intervals that are smaller than the threshold value). After the AMR completes the operation, the AMR can exit the physical location. In some examples, exiting the physical location can allow the AMR to revert back to the first safety mode.

In an example, the flow 1300 can include operation 1310, involving the AMR stopping performance of the operation. The AMR may not be authorized to perform the operation if the signal has not been received recently (e.g., within the threshold value). In an example, the flow 1300 can include operation 1312, involving the AMR switching to another safety mode. For example, the AMR may switch to the first safety mode. This can involve, for example, turning on object detection systems to detect a human if the AMR is in a physical location such as a workcell. In another example, the AMR may switch to a third safety mode. For example, if the AMR is in a physical location such as a high-speed area, the third safety mode may involve the AMR exiting the high-speed area at a particular speed. Other examples include the AMR being immobilized, moving away from a detected object, or any other safety operation.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms “a” and “an” and “the” and similar referents in the context of describing the disclosed embodiments (especially in the context of the following claims) are to be construed to cover both the singular and the plural, unless otherwise indicated herein or clearly contradicted by context. The terms “comprising,” “having,” “including,” and “containing” are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A system comprising:

a location marker configured to be installed at a physical location that is stationary and to encode a first location identifier of the physical location;

a device that is separate from the location marker and that is configured to be co-located with the location marker at the physical location and to transmit a signal encoding a permission to operate in the physical location based at least in part on occupancy of the physical location, the signal encoding the first location identifier; and an autonomous mobile robot (AMR) configured to:

receive the signal;

determine the first location identifier based at least in part on an optical read of the location marker;

determine a second location identifier based at least in part on the signal;

determine a match between the first location identifier and the second location identifier;

determine, based at least in part on the match, the permission indicated in the signal;

determine that an operation is permitted in the physical location based at least in part on the permission; and perform the operation based at least in part on the operation being permitted.

2. The system of claim 1, wherein the location marker and the device are co-located at an entrance of the physical location, and wherein the operation comprises entry into the physical location via the entrance.

3. The system of claim 1, wherein the location marker comprises a fiducial marker that encodes the first location identifier and that is attached to the device, wherein the fiducial marker further encodes data integrity information associated with the first location identifier.

4. The system of claim 3, wherein the fiducial marker further encodes dimension data, and wherein the AMR is further configured to:

generate an image of the fiducial marker;

determine the dimension data and the first location identifier based at least in part on the image;

determine proximity to the fiducial marker based at least in part on the fiducial marker; and determine that the first location identifier is usable for matching with the second location identifier based at least in part on the proximity being within a proximity threshold.

5. A method implemented by an autonomous mobile robot (AMR), the method comprising:

determining a first identifier based at least in part on a first signal associated with a location marker, the location marker associated with a physical location that is stationary;

receiving a second signal transmitted by a device that is separate from the location marker, the device associated with the physical location, the second signal indicating a second identifier and encoding a permission to perform an operation at the physical location;

determining a match between the first identifier and the second identifier;

determining, based at least in part on the match, that the operation is to be performed at the physical location; and performing the operation at the physical location.

6. The method of claim 5, further comprising:

determining the second identifier based at least in part on the second signal, wherein the first identifier is determined at a first time, wherein the second identifier is determined at a second time;

determining a time difference between the first time and the second time; and determining that at least one of the first identifier or the second identifier is usable to determine the match based at least in part on the time difference.

7. The method of claim 5, further comprising:

receiving a third signal transmitted by a different device, the different device associated with a different physical location, the third signal indicating a third identifier;

determining a mismatch between the first identifier and the third identifier; and forgoing using the third signal to determine whether a different operation is to be performed.

8. The method of claim 5, further comprises:

switching, based at least in part on the match, from operating in a first safety mode to operating in a second safety mode, wherein the operation is performed while the AMR is operating in the second safety mode;

receiving a third signal transmitted by the device, the third signal indicating a third identifier;

determining another match between the first identifier and the third identifier; and continuing to operate in the second safety mode, wherein the operation continues to be performed or another operation is performed by the AMR at the physical location while operating in the second safety mode.

9. The method of claim 8, further comprising:

determining a time period since a last signal was received from the device and indicated an identified matched with the first identifier;

determining that the time period exceeds a threshold value; and switching to operate in the first safety mode or a third safety mode.

10. The method of claim 5, further comprising:

determining, based at least in part on the match, a command indicated in the second signal; and performing the command by at least switching to a safety mode or starting the operation.

11. The method of claim 5, wherein the operation is performed based at least in part on the permission and includes at least one of: entry into the physical location or movement within the physical location.

12. The method of claim 5, wherein the operation, the match, the device, and the physical location are a first operation, a first match, a first device, and a first physical location, respectively, and wherein the method further comprises:

determining, based at least in part on the match, that the second signal indicates the permission to perform the first operation while the AMR is operating in a first safety mode;

receiving, while being outside of the first physical location, a third signal transmitted by a second device that is associated with a second physical location;

determining a second match between a third identifier indicated by the third signal and a fourth identifier associated with the second physical location; and performing, based at least in part on the second match, a second operation at the second physical location while the AMR is operating in a second safety mode.

13. The method of claim 5, further comprising:

determining, based at least in part on the first signal, proximity to at least one of the location marker, the device, or the physical location; and determining that at least one of the first identifier or the second identifier is usable to determine the match based at least in part on the proximity.

14. The method of claim 5, wherein the match is a first match, and wherein the method further comprises:

determining that the physical location is associated with an expected identifier;

determining a second match between the first identifier and the expected identifier; and determining, based at least in part on the second match, that at least one of the first identifier or the second identifier is usable to determine the first match.

15. One or more non-transitory computer-readable media storing instructions that, upon execution by one or more processors of an autonomous mobile robot (AMR), configure the AMR to perform operations comprising:

determining a first identifier based at least in part on a first signal associated with a location marker, the location marker associated with a physical location that is stationary;

receiving a second signal that indicates a second identifier and that is transmitted by a device that is separate from the location marker, the device associated with the physical location, the second signal encoding a permission to perform an operation at the physical location;

determining a match between the first identifier and the second identifier;

determining, based at least in part on the match, that the operation is to be performed at the physical location; and performing the operation at the physical location.

16. The one or more non-transitory computer-readable media of claim 15, wherein the second signal is received based at least in part on a safety state associated with the operations.

17. The one or more non-transitory computer-readable media of claim 15, wherein the second signal includes a first set of bits that represents the second identifier and a second set of bits that represents a command indicating the operation to be performed.

18. The one or more non-transitory computer-readable media of claim 15, wherein the second signal is received based at least in part on a safety state that is based at least in part on an occupancy of the physical location and is associated with a safety mode of the AMR.

19. The one or more non-transitory computer-readable media of claim 15, wherein the second identifier changes over time.

20. The one or more non-transitory computer-readable media of claim 15, wherein the operations further comprise:

transmitting, to the device, a request to transmit the second signal based at least in part on determining the first identifier from the location marker.

* * * * *